US012510894B2

(12) United States Patent
Ricke

(10) Patent No.: US 12,510,894 B2
(45) Date of Patent: Dec. 30, 2025

(54) METHOD FOR COORDINATING A VEHICLE IN A DEPOT, AND FUNCTION CONTROL DEVICE AND VEHICLE

(71) Applicant: ZF CV Systems Global GmbH, Bern (CH)

(72) Inventor: Janik Ricke, Uetze (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 358 days.

(21) Appl. No.: 17/375,016

(22) Filed: Jul. 14, 2021

(65) Prior Publication Data

US 2022/0026915 A1   Jan. 27, 2022

(30) Foreign Application Priority Data

Jul. 22, 2020  (DE) ................... 10 2020 119 318.1

(51) Int. Cl.
*G05D 1/00*  (2024.01)

(52) U.S. Cl.
CPC ......... *G05D 1/0225* (2013.01); *G05D 1/0219* (2013.01); *G05D 1/0223* (2013.01)

(58) Field of Classification Search
CPC ............... G05D 1/0225; G05D 1/0214; G05D 2201/0213; G05D 1/0295; G05D 1/0027; G05D 1/0293; G05D 1/0219; G05D 1/0223; G05D 1/0282; B60W 30/60; G08G 1/168

See application file for complete search history.

(56) References Cited

U.S. PATENT DOCUMENTS

| 2004/0158355 A1 | 8/2004 | Holmqvist et al. |
| 2004/0199306 A1 | 10/2004 | Heilmann et al. |
| 2004/0267411 A1 | 12/2004 | Mayer et al. |

(Continued)

FOREIGN PATENT DOCUMENTS

| CN | 110780671 A * | 2/2020 | ........... G05D 1/0217 |
| DE | 10259168 A1 | 7/2004 | |

(Continued)

OTHER PUBLICATIONS

Machine Translation CN-110780671-A (Year:2020).*

*Primary Examiner* — Anne Marie Antonucci
*Assistant Examiner* — Wesam Almadhrhi
(74) *Attorney, Agent, or Firm* — LEYDIG, VOIT & MAYER, LTD.

(57) ABSTRACT

A method for coordinating a vehicle in a depot divided into multiple function regions, the vehicle being driven in the depot through at least some of the function regions into a defined destination region, includes receiving a travel profile. The travel profile has at least one function rule, each function rule of the at least one function rule being assigned to a function region in the depot and defining how the vehicle is activated and/or may not be activated in the depot in the respectively assigned function region. While the vehicle is being driven through at least some of the function regions into the destination region, the method includes continuously ascertaining a position of the vehicle, ascertaining, from the received travel profile, the function region assigned to the presently ascertained position of the vehicle, and reading in, from the received travel profile, the function rule assigned to the region.

19 Claims, 3 Drawing Sheets

(56) References Cited

U.S. PATENT DOCUMENTS

| | | | |
|---|---|---|---|
| 2015/0262478 A1* | 9/2015 | Yoshida | G08G 1/202 |
| | | | 701/1 |
| 2017/0038777 A1* | 2/2017 | Harvey | B60Q 1/508 |
| 2019/0196491 A1* | 6/2019 | Balogh | G05D 1/0214 |
| 2020/0150686 A1 | 5/2020 | Wieschemann et al. | |
| 2020/0223647 A1 | 7/2020 | Pollak Von Emhofen | |
| 2020/0393849 A1* | 12/2020 | Ishikawa | B60W 30/09 |
| 2021/0150428 A1* | 5/2021 | Walet | G06Q 10/06313 |
| 2023/0143065 A1* | 5/2023 | Sun | B65G 1/1373 |
| | | | 700/214 |

FOREIGN PATENT DOCUMENTS

| | | |
|---|---|---|
| DE | 10322765 A1 | 1/2005 |
| DE | 102014224124 A1 | 6/2016 |
| DE | 102016116857 A1 | 3/2018 |
| DE | 102016219121 A1 | 4/2018 |
| DE | 102019205892 A1 | 10/2020 |
| EP | 3284654 A1 | 2/2018 |

\* cited by examiner

METHOD FOR COORDINATING A VEHICLE IN A DEPOT, AND FUNCTION CONTROL DEVICE AND VEHICLE

CROSS-REFERENCE TO PRIOR APPLICATION

Priority is claimed to German Patent Application No. DE 10 2020 119 318.1, filed on Jul. 22, 2020, the entire disclosure of which is hereby incorporated by reference herein.

FIELD

The invention relates to a method for coordinating a vehicle in closed premises, in particular in a depot, and to a function control device and a vehicle for carrying out the method.

BACKGROUND

In automated or semi-automated depots or haulage yards, a static local network may be provided which covers spatially limited surroundings of the depot and by means of which an exchange of data can take place between an arriving vehicle and the depot. Such automated or semi-automated depots make only very limited use of the data connection between the vehicle and a central module of the static local network for an increase in the level of automation.

For example, it is described in DE 10 2014 224 124 A1 that the vehicle logs in and receives data from a central module of the depot, which data specify an exact start position and an exact destination position and also a trajectory between the two positions. A control device in the vehicle is then designed to drive the vehicle from the start position to the destination position along the specified trajectory on the basis of the received data.

In DE 103 22 765 A1, it is furthermore described that the vehicle is driven autonomously to individual stations, wherein, for this purpose, a path calculation is used for ascertaining a trajectory. The vehicle then moves between the individual stations on said specified trajectory.

DE 10 2016 116 857 A1 likewise provides automated driving of a vehicle from an entry point or an entrance to a destination point along a movement path or a trajectory.

A disadvantage of the known methods for increasing the level of automation is in this case that trajectories to the respective destination positions are specified for the vehicles, which trajectories possibly cannot be adhered to by the vehicles or are not optimal for efficient operational activity in the depot. The respective vehicle is thus possibly unduly restricted in terms of its movement. Furthermore, only specifications that relate to the driving dynamics or the movement of the vehicle between the start position and the destination position are made.

SUMMARY

In an embodiment, the present invention provides a method for coordinating a vehicle in a depot, the depot being divided into multiple function regions, the vehicle being driven in the depot through at least some of the function regions into a defined destination region, the method comprising: receiving a travel profile, the travel profile comprising at least one function rule, each function rule of the at least one function rule being assigned to a function region in the depot and defining how the vehicle is activated and/or may not be activated in the depot in the respectively assigned function region; while the vehicle is being driven through at least some of the function regions into the destination region: continuously ascertaining a position of the vehicle in the depot; ascertaining, from the received travel profile, the function region assigned to the presently ascertained position of the vehicle; reading in, from the received travel profile, the function rule assigned to the ascertained function region; and activating the vehicle in a manner dependent on the read-in function rule such that the function rule in the function region presently being traveled through is implemented.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
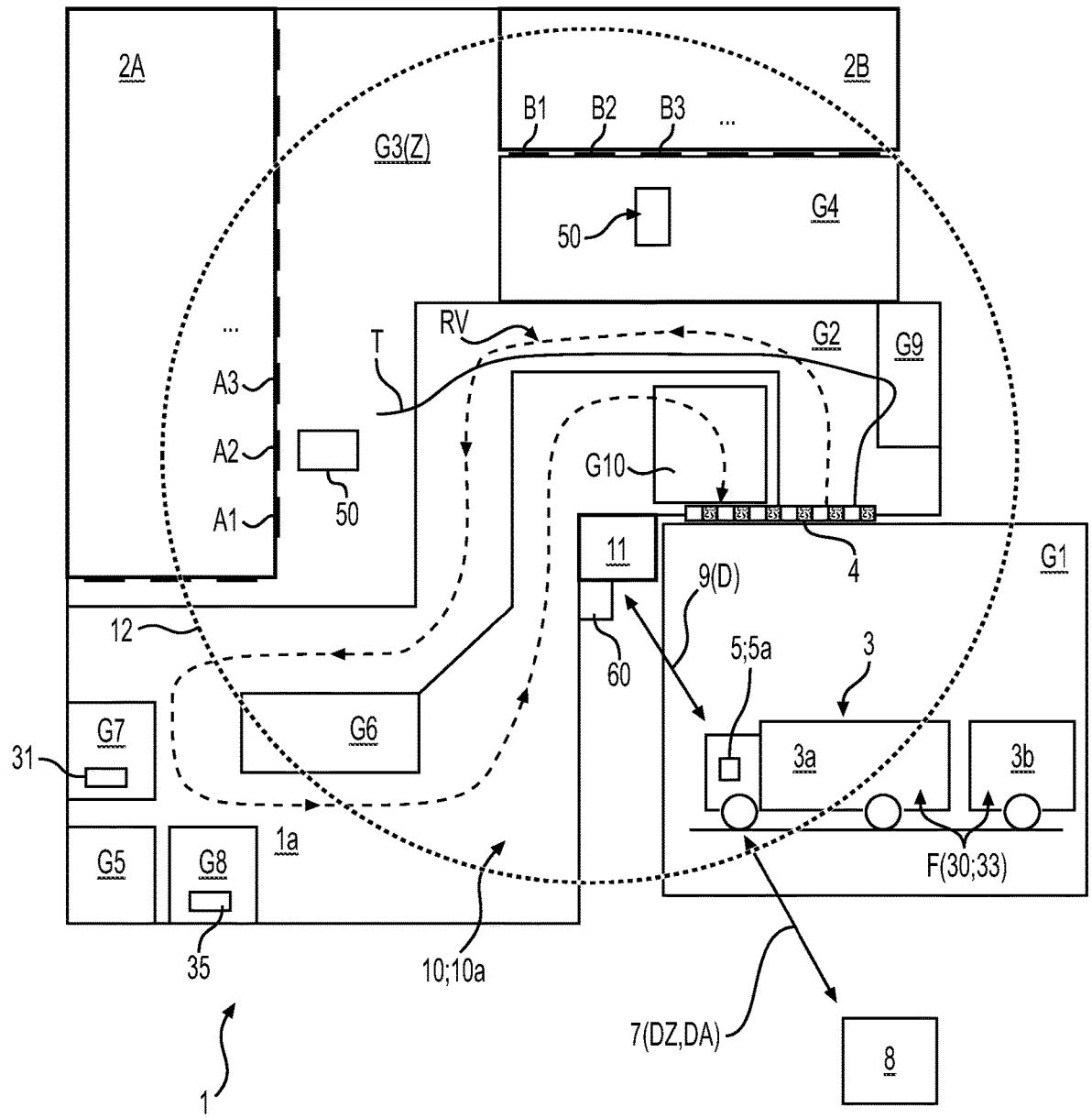
FIG. 1 shows a schematic view of a depot with an arriving vehicle.

In an embodiment, the present invention provides a method for coordinating a vehicle in a depot, such that the vehicle can move in a flexible and nevertheless safe manner in the depot. In an embodiment, the present invention provides a function control device and a vehicle.

According to the invention, it is thus the case that a method for coordinating a vehicle, in particular a utility vehicle, in a depot is specified, the depot being divided into multiple function regions, the vehicle being driven in the depot through at least some of the function regions into a defined destination region. Here, coordinating is to be understood to mean that certain rules or behaviors are transmitted to the vehicle, which the vehicle must adhere to while traveling through the individual function regions on the path to the destination region. For this purpose, the method is carried out with at least the following steps:

receiving a travel profile, the travel profile comprising at least one function rule, each function rule being assigned to a function region in the depot and the function rule defining how the vehicle is activated and/or may not be activated in the depot in the respectively assigned function region. Therefore, position-related rules or behaviors are specified for the vehicle, and these are transmitted to the vehicle by way of the travel profile.

While the vehicle is being driven through at least some of the function regions into the destination region, the following further steps are carried out:

continuously ascertaining a position of the vehicle in the depot, described preferably by absolute or relative coordinates;

ascertaining the function region which is assigned to the presently ascertained position of the vehicle and which is preferably likewise described by absolute or relative coordinates, said ascertainment being performed on the basis of the received travel profile;

reading in the function rule assigned to the ascertained function region, this likewise being performed on the basis of the received travel profile; and activating the vehicle in a manner dependent on the read-in function rule such that the function rule in the function region presently being traveled through is implemented. The vehicle is thus ultimately activated, or specifically not activated, in the manner specified or defined by the function rule. This may preferably be performed such that at least one vehicle system of the vehicle is actively or targetedly activated, and/or an activation of at least one vehicle system is targetedly restricted and/or an activation is prevented entirely.

It is advantageously thus the case that simple behavior instructions are transmitted to the vehicle by way of the travel profile, which the vehicle must adhere to on the path into the destination region. Accordingly, no strict specification of a trajectory between the present position (starting point) and a defined position in the destination region (destination point) from an outside (external) source is necessary, whereby the rigid definition of such a trajectory from an external source, for example by the depot, can be omitted. Rather, it is merely the case that extensive mapped regions are specified within which the vehicle can move virtually freely in order to reach the destination region. The coordination and the amounts of data involved are thus optimized overall, and the vehicle can itself select the path to the destination region so as to adhere to the defined function rules, which may include local and/or driving-dynamics-related restrictions. The vehicle therefore also retains a certain freedom of movement, which can be utilized either through manual or automated control.

The operator of the depot can in this case map the depot in advance and define, with regard to safety aspects, how a vehicle should behave in the respective function region. For this purpose, certain function rules are available, to which the vehicle also has access by virtue of the function rules for example also being stored in a library on the vehicle.

It is preferably furthermore provided that the travel profile is assigned to the vehicle and the travel profile is provided via a local network, for example a WLAN network, of the depot. The travel profile may thus advantageously be defined in a manner specific to the vehicle, such that it is also possible for different rules to apply regionally for each vehicle, for example in a manner dependent on the field of activity or type of the vehicle. The path through said function regions can then be selected in a flexible manner by each vehicle, while adhering to the function rules.

In addition to this, it may be provided that the vehicle connects to the local network by way of access data and/or authentication data in order to obtain access to the local network and to premises of the depot in order to travel through the function regions. In this way, access to the depot can be granted only to authorized participants, and at the same time it can also be established what task the respective vehicle has in the depot and possibly also what function regions, with what function rules, may be traveled through.

It is preferably furthermore provided that the vehicle is driven in the depot from an entrance region to a destination region assigned to the vehicle, the function regions being traveled through on the path from the entrance region to the destination region. Here, the transmission of the travel profile may preferably be performed in the entrance region after an access authorization has been checked and access to the depot has been approved. Here, the destination region may preferably be defined in a manner dependent on freight which has been loaded or which is to be loaded and/or in a manner dependent on a participant identifier assigned to the vehicle, which participant identifier is also required for identification and/or authentication purposes. Further specifications relating to the specific vehicle are thus used for the coordination by way of the travel profile.

It is preferably furthermore provided that the function rules of the individual function regions are defined in the travel profile such that the vehicle is driven and/or may be driven in the depot only through those function regions that are required to reach the destination region and/or that are allowed for reaching the destination region. For the coordination of the vehicle in the depot, it is thus possible in a simple manner for corresponding location-bound behaviors to be specified which prohibit travel into non-required or non-allowed function regions of the depot without great outlay, for example by virtue of a function rule with a general travel prohibition being defined in said non-required or non-allowed function regions.

It is preferably furthermore provided that the vehicle system is a brake system and/or a drive system and/or a steering system of the vehicle, the activation of which can be allowed or restricted or prevented in order to implement the function rule in the respective function region. It is thus advantageously possible to intervene in the driving dynamics of the vehicle if the respective function rule requires this, for example because steering in one direction is restricted or reverse travel or the overshooting of a maximum speed, or general travel into a function region, is prohibited.

It is preferably furthermore provided that the vehicle system is a ride-height control system and/or an unloading system and/or a door system and/or a coupling system, the activation of which can be allowed or restricted or prevented in order to implement the function rule in the respective function region. It is thus advantageously also possible for the opening of a door of the tractor vehicle and/or of the trailer, the unloading of freight or the decoupling of a trailer or the lowering of the chassis of the vehicle to be controlled, such that not only local and driving-dynamics-related behavior rules can be defined by way of the travel profile.

It is preferably furthermore provided that the function rule in the respective function region has at least one prohibition selected from the group comprising: a decoupling prohibition, a travel prohibition, an unloading prohibition, a reverse travel prohibition, a door opening prohibition, a turning prohibition. It is thus advantageously possible for targeted prohibitions to be expressed which can be implemented in a simple manner through automated activation, or a prohibition of the manual or automated activation, of the corresponding vehicle system.

It may however preferably also be provided that the function rule in the respective function region has a priority instruction and/or a maximum speed to be adhered to. It is thus also possible for such instructions or behaviors to be specified which can likewise be implemented through corresponding automated activation, or a prohibition of the manual or automated activation, of the respectively applicable vehicle system, for example brake system.

It is preferably furthermore provided that the multiple function regions in the depot are regions selected from the group comprising: an entrance region, a traveling lane region, at least one building region with in each case one building and with ramps, a loading region for bulk material, a first placement region for the set-down of a trailer, a second placement region for the set-down of a container on a swap body, a silo region for the pick-up of material from a silo, a waiting region, an exit region. A variable layout of the depot is thus possible, for which different regions can be mapped in a flexible manner.

It is preferably furthermore provided that the continuous ascertainment of the position of the vehicle is performed by ascertainment of absolute coordinates and/or relative coordinates of the vehicle in the depot, for example by means of a position acquisition system and/or by odometry, the individual function regions also being defined by absolute coordinates and/or relative coordinates. In this way, it is possible in a simple manner, and using existing sensors in the vehicle, to ascertain the function region in which the vehicle is presently situated.

It is preferably furthermore provided that the vehicle is driven in the depot through the at least some function regions on the basis of a planned trajectory, the trajectory being individually planned, preferably in the vehicle itself, in a manner dependent on the read-in function rules and/or the transmitted travel profile. Therefore, there is specifically no provision of an external specification (for example from the depot) of a trajectory that must be rigidly adhered to, as in the prior art. Therefore, on the basis of the restrictions from the travel profile and/or the function rules, an optimum path through the respectively allowed or required function regions to the destination region can be ascertained individually for each vehicle, which path is either implemented through automated activation of the vehicle or is displayed to the driver such that they can move along the path in an optimum manner. The vehicle controlled manually or in automated fashion may however basically also deviate from the trajectory, or the trajectory may also be adapted in a manner dependent on the situation, within the scope of the specifications or function rules from the travel profile. Variable travel through the individual function regions whilst adhering to the function rules therefore also remains possible.

It is preferably furthermore provided that an emergency function is provided, the vehicle being driven in the respective function region independently of the specified function rules and/or the transmitted travel profile in the event of activation of the emergency function. In certain situations, it is thus also possible to deviate from the function rules, for example in emergencies or preferably if the vehicle is situated in the respective function region at a position at which the vehicle can no longer implement the respectively assigned function rule. This may be the case if the vehicle has "become stuck" or has a defect that makes adherence to the function rules not possible. In the event of the emergency function being activated, the control of the vehicle may for example be taken over by a remote operator or else by the driver, if the driver is present in the vehicle.

According to the invention, a function control device for carrying out the method according to the invention is furthermore provided, the function control device being designed to receive a travel profile, the travel profile comprising at least one function rule, each function rule being assigned to a function region in the depot and the function rule being capable of defining how the vehicle may be activated and/or not activated in the depot in the respectively assigned function region;

to continuously ascertain a position of the vehicle in the depot;

to ascertain, from the received travel profile, the function region assigned to the presently ascertained position of the vehicle;

to read in, from the received travel profile, the function rule assigned to the ascertained function region; and to activate the vehicle in a manner dependent on the read-in function rule such that the function rule in the function region presently being traveled through can be implemented. Here, the function control device may be independent and have access to the respectively required vehicle components, for example via a data bus, or else may be integrated in one of the vehicle systems, for example in the brake system.

Furthermore, a vehicle according to the invention is provided, in particular a utility vehicle, which has a function control device according to the invention, such that the method according to the invention can be carried out therein. Here, the vehicle may be of single-part or two-part form, and the function control device may, in the case of a two-part design, be arranged in a tractor vehicle or in a trailer in order to be able to correspondingly coordinate travel in the depot.

FIG. 1 illustrates a depot 1 which, at two buildings 2A, 2B, has in each case multiple ramps Ai, Bi, where i=1, 2, . . . , for the loading and unloading of a vehicle 3, in particular of a utility vehicle, which may be of single-part form or multi-part form (with trailer(s) 3b). The depot 1 is accessible via an entrance 4, for example a gate or a barrier, wherein an entrance region G1 is set up in front of the entrance 4.

The depot 1 is a closed region, for which access authorization is preferably required. An arriving vehicle 3, for example a tractor vehicle 3a with a trailer 3b, can, when the entrance 4 is open, travel from the entrance region G1 onto the premises 1a of the depot 1 and move for example to one of the ramps Ai, Bi in order for freight F that is to be transported to be loaded there and/or for transported freight F to be unloaded there. Here, the vehicle 3 may be operated in manual, semi-automated or fully automated fashion that is to say with an SAE autonomy level of at least 3.

The depot 1 allows fully automated or at least semi-automated handling, wherein, for this purpose, use is made of an automated exchange of data D with the vehicle 3 that is to say with the tractor vehicle 3a and/or with the trailer 3b. Both automated access to the premises 1a of the depot 1 and coordination of the vehicle 3 within the depot 1 can be provided for by way of the automated exchange of the data D. Manual handling in the depot 1 is however basically also possible, wherein it is then likewise the case that data D for the access to and the coordination in the depot 1 are exchanged in automated fashion.

Here, coordination is to be understood to mean that, after access authorization has been granted, the vehicle 3 is guided for example to the correct building 2A, 2B and also to the respective ramp Ai, Bi. The implementation is then correspondingly performed in manual or (partially) automated fashion. Furthermore, function rules Ri, where i=1, 2, . . . , are specified for the vehicle 3, which function rules define the behavior of the vehicle 3 on the premises 1a of the depot 1. It is thereby defined what functions may be carried out with or by the vehicle 3 and what functions are prohibited, as will be discussed in more detail further below. All of this serves for the coordination of the vehicle 3 in the depot 1.

Figure 2:
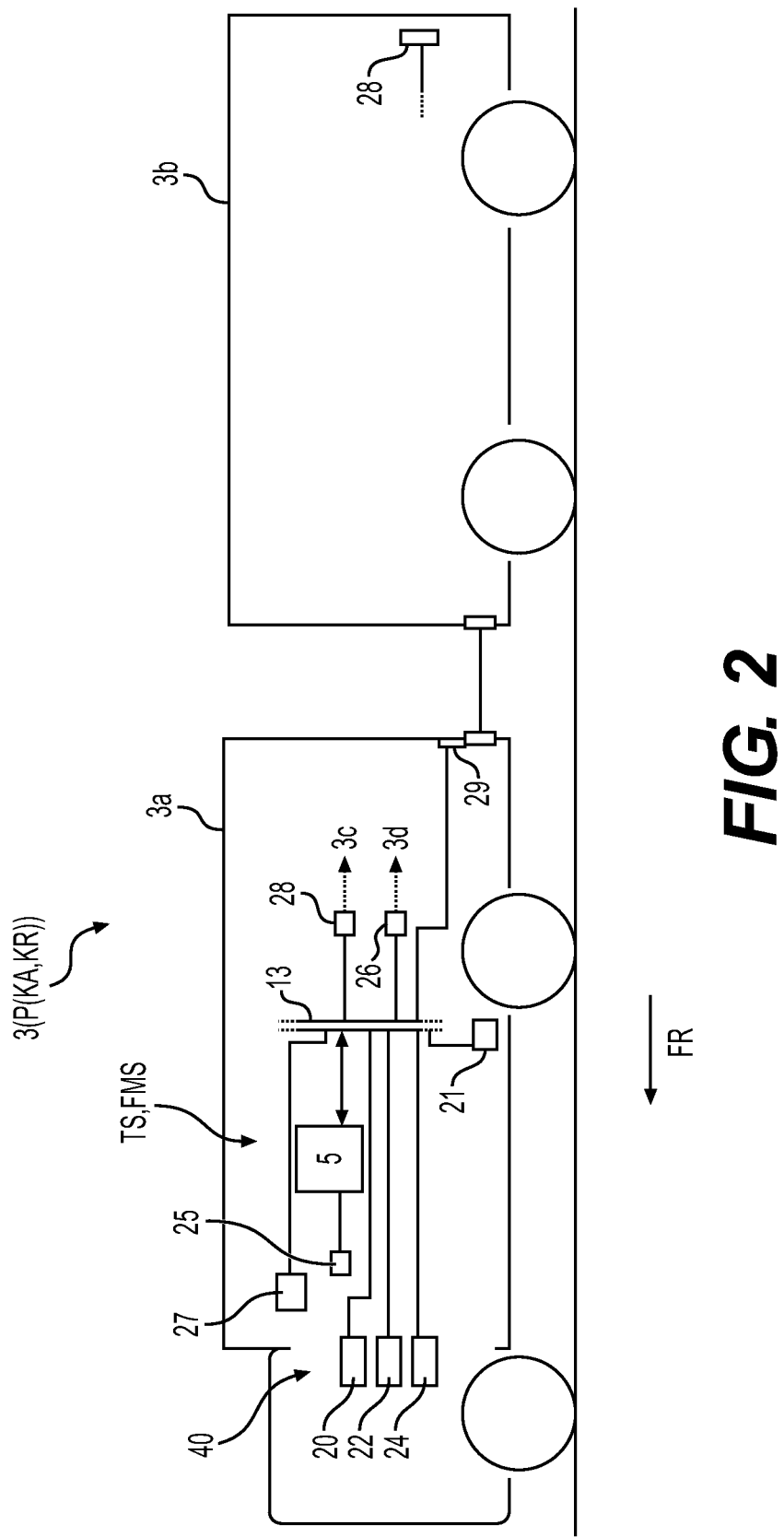
FIG. 2 shows the vehicle as per FIG. 1 in a detail view.

For the exchange of data, the vehicle 3 has, as per FIG. 2, a function control device 5 assigned thereto, which may be a constituent part of a telematics system TS, in particular of a fleet management system (FMS). For this purpose, the function control device 5 may be fixedly installed in the vehicle 3, that is to say in the tractor vehicle 3a or in the trailer 3b, either as a constituent part of another structural unit, for example of a brake system 20, or else as an independent structural unit. Furthermore, the function control device 5 may however also be designed as a mobile function control device 5a. The mobile function control device 5a may for example be a mobile telephone, laptop, tablet etc., on which the software of the fleet management system FMS is installed as an application or program. Here, the function control device 5 is connected in any desired manner to a data bus 13 in the vehicle 3 in order to be able to access further information in the vehicle 3, and/or be able to activate further vehicle systems 40 in the vehicle 3, for the coordination of the vehicle 3 in the depot 1.

Here, the function control device 5 is in particular designed to receive pre-encrypted access data DZ, and possibly also extended authentication data DA, for example from a program or a server of a service provider, via an access network 7 (wirelessly or in wired fashion). Said access data DZ or authentication data DA serve for the connection to a static and local network 10 of the depot 1. The access data DZ or authentication data DA may be transmitted to the vehicle 3 in advance via the access network 7, for example before the vehicle 3 reaches the entrance region G1.

The function control device 5 in the arriving vehicle 3 is furthermore designed to automatically connect to the static and local network 10, for example a WLAN network 10a, of the depot 1. For this purpose, the function control device 5 may establish any desired wireless data connection 9 to a central module 11 of the static local network 10. Here, the central module 11 has a particular transmitting and receiving region 12 which at least partially covers the entrance region G1 of the depot 1.

By contrast to a global network, the transmitting and receiving region 12 covers only local or limited spatial surroundings, which in this case encompasses at most the region of the demarcated depot 1. Accordingly, access to the static local network 10 is possible only within the transmitting and receiving region 12 of the central module 11 in the spatially limited surroundings, and thus from a very limited number of positions.

As soon as the function control device 5 passes into this limited transmitting and receiving region 12, the data connection 9 between the central module 11 and the function control device 5 can be established in any desired manner on the basis of the access data DZ transmitted in advance or the authentication data DA. In a manner dependent on a participant identifier TK assigned to the vehicle 3, which may be included for example in the access data DZ, the central module 11 can identify and also authenticate the participant or the respective vehicle 3. The central module 11 can thereupon check an authorization for access to the premises 1a, and grant access for the vehicle 3 both to the static, local network 10 and to the depot 1.

If access has been authorized, data D can subsequently be exchanged bidirectionally via the then established data connection 9 for the purposes of coordinating the vehicle 3 on the premises 1a of the depot 1. The transmitted data D may in this case be dependent on the participant identifier TK and/or include loading information IB and/or unloading information IE. From these specifications (TK, IB, IE), it is for example possible for the type of vehicle 3, and possibly its assignment, or what freight F the vehicle 3 has loaded thereon or what freight F is to be loaded onto the vehicle 3, to be ascertained. These specifications (TK, IB, IE) thus determine which destination region Z the vehicle 3 is to move into in the depot 1.

Here, the destination region Z is selected from the function regions Gi that are situated in the depot 1, wherein, as per FIG. 1, the following function regions Gi are possible as destination regions Z:

a first building region G3 in front of the first building 2A with the ramps Ai, a second building region G4 in front of the second building 2B with the ramps Bi, a loading region G5 for the unloading and loading of bulk material 33, a first placement region G6 for the set-down of a trailer 3b or for the pick-up of a set-down trailer 3b, a second placement region G7 for the set-down of a loaded container 30 onto a swap body 31 or for the pick-up of a set-down container 30, a silo region G8 for the pick-up of material from a silo 35.

Depending on the type of depot 1, further function regions Gi are also possible as destination regions Z.

After the allocation of a destination region Z, a travel profile FP is transmitted to the vehicle 3 (participant) via the data connection 9, which travel profile serves for the coordination of the vehicle 3 in the depot 1. Here, the travel profile FP indicates the function regions Gi via which the vehicle 3 moves to its allocated destination region Z. Function regions Gi that can be traveled through between the entrance region G1 and the respective destination region Z may for example be a traveling lane region G2 or a waiting region G9 for the temporary parking of the vehicle 3.

A finer subdivision, or further function regions Gi, are basically also possible. For example, if sufficient space is available on the premises 1a of the depot 1, it is also possible for multiple traveling lane regions G2 to be defined adjacent to one another, such that, for example, two vehicles 3 can travel parallel to one another without impeding one another.

If, on this basis, the first building region G3 is defined as destination region Z, the travel profile FP may for example include that, proceeding from the entrance region G1, the traveling lane region G2 and subsequently the first building region G3 are to be traveled through. If a ramp Ai allocated to the vehicle 3 in the first building region G3 is presently occupied, it may additionally be specified in the travel profile FP that the vehicle 3 is firstly to travel from the entrance region G1 via the traveling lane region G2 into the waiting region G9 in order to be temporarily parked so as not to block the entrance region G1 and the traveling lane region G2. It is also defined in the travel profile FP that the vehicle 3 is to travel from the waiting region G9 via the traveling lane region G2 into the first building region G3 or the destination region Z when the allocated ramp Ai in the first building region G3 is free again or no longer occupied.

In this way, a type of schedule of the function regions Gi in which the vehicle 3 is to stop is transmitted to the vehicle 3 by way of the travel profile FP. Here, said schedule applies both for manual travel and for fully automated travel in the depot 1.

It is additionally also defined in the respective travel profile FP what function rules Ri, to be discussed in more detail further below, are to be adhered to in the respective function regions Gi of the depot 1, that is to say how the vehicle 3 is to behave in the respective function regions Gi. Here, the individual function rules Ri may be formulated in the form of prohibitions or in the form of permissions. Thus, by way of the transmitted travel profile FP, the vehicle 3 is simultaneously also provided with position-related rules that it must adhere to on the path from the entrance region G1 to the destination region Z, or generally on the premises 1a of the depot 1. Here, these position-related function rules Ri apply both for manual travel and for fully automated travel.

To provide such a travel profile FP, the depot 1 is firstly mapped and divided into different areas or into the function regions Gi, where i=1, 2, n . . . . Here, each function region Gi may be described by absolute coordinates KA or relative coordinates KR, which lie for example at the virtual edge or the virtual boundary of the respective function region Gi. Orientation lines may additionally be applied to the ground. In this way, by way of a position acquisition system 25, for example GPS, GLONASS, BeiDou, Galileo, etc., or by odometry O, the vehicle 3 can continuously ascertain the function region Gi in which it is presently situated. Here, the orientation lines may serve as additional means of orientation which, in the case of manual travel, can be seen by the driver or, in the case of automated travel, can be detected by means of a surroundings acquisition system 27.

On this basis, the function rules Ri are defined for example as follows:

The mapped traveling lane region G2 is provided for guiding a vehicle 3, which is passing from the entrance region G1, to the respective destination region Z or function region Gi (where i>2). At the same time, the traveling lane region G2 however also leads to an exit region G10, such that the vehicle 3 can also depart the depot 1 again via the traveling lane region G2 after carrying out its tasks (loading, unloading etc.). Here, the traveling lane region G2 is for example a type of travel corridor within which the vehicle 3 can move freely with certain restrictions that are encapsulated in traveling lane function rules R2.

In order to avoid two-way traffic, the traveling lane region G2 is configured as a one-way road. For this purpose, the traveling lane function rule R2 includes that the vehicle 3 in the traveling lane region G2 may not move counter to a forward direction of travel RV, wherein the forward direction of travel RV within the traveling lane region G2 runs from the entrance region G1 to the exit region G10, as illustrated by dashed lines in FIG. 1. Thus, in the traveling lane region G2, the vehicle 3 has in particular a reverse travel prohibition VR and/or a turning prohibition VW, because, for these, a direction of travel FR of the vehicle 3 would be oriented counter to the forward direction of travel RV.

Additionally, the traveling lane function rule R2 may include a priority instruction AV. This defines, for example, that other vehicles 50 in the depot 1 which are crossing or partially protruding into the traveling lane region G2 have priority. The vehicle 3 which is situated in the traveling lane region G2 and which is moving to its destination region Z must accordingly always give consideration to other vehicles 50 in the traveling lane region G2, in particular must wait until unimpeded onward travel is possible in the forward direction of travel RV in the traveling lane region G2, or must travel around the other vehicle 50 within the traveling lane region G2 while adhering to the traveling lane function rule R2. Here, an identification of other vehicles 50 in the traveling lane region G2 may be performed for example with the aid of the surroundings acquisition system 27. Wireless communication between the two vehicles 3, 50 for the purposes of coordination is however also possible.

In a manner coordinated with the priority instruction AV for the traveling lane region G2, there may also be a priority instruction AV for the first and the second building region G3, G4, wherein these are then included in the correspondingly assigned building function rules R3, R4. The priority instructions AV for the building regions G3, G4 define for example that a vehicle 3 that is situated in the building regions G3, G4 may protrude into the traveling lane region G2, for example when maneuvring to the respective ramp Ai, Bi. Crossing of the traveling lane region G2, or travel into the traveling lane region G2, for example in order to arrive at the exit region G10, are also possible in accordance with the priority instruction AV, with priority over vehicles 3 in the traveling lane region G2.

Other function regions Gi may also have such priority instructions AV in their respectively associated function rules Ri. For example, a waiting function rule R9 for the waiting region G9 may have a priority instruction AV which allows a vehicle 3 to travel into the traveling lane region G2 from the waiting region G9 with priority over other vehicles 50 in the traveling lane region G2. The priority instructions AV of different function regions Gi must then be correspondingly coordinated with one another.

Furthermore, the traveling lane function rule R2 assigned to the traveling lane region G2 may include that an opening of doors 3c of the vehicle 3 is prohibited (door opening prohibition VT) and/or also a (manual or automated) decoupling of a trailer 3b is prohibited (decoupling prohibition VA). Furthermore, the traveling lane function rule R2 may also define the maximum speed vMax with which the vehicle 3 may move in the traveling lane region G2. This may also be implemented in position-dependent fashion. If the vehicle 3 is situated for example on a straight section in the traveling lane region G2, a higher maximum speed vMax may be allowed than in a curve or close to an entry point. It is also possible for the unloading of freight F (bulk material 33, container 30 etc.) to be prohibited for the traveling lane region G2 (unloading prohibition VF), which may be implemented for example by virtue of tipping of a loading surface 3d of the trailer 3b and/or of the tractor vehicle 3a being prevented or by virtue of a lowering of the vehicle 3 by means of an active ride-height control system 21 (air suspension, ECAS) for the set-down of the container 30 on a swap body 31 being prevented.

In this way, it is possible for different prohibitions or permissions to be defined in the function rules Ri for each function region Gi, wherein this is implemented in a manner dependent on the benefit of the respective prohibition or the respective permission. Accordingly, in the building regions G3, G4, a (manual or automated) decoupling prohibition VA may be expedient whereas a reverse travel prohibition VR may not be, because the vehicle 3 must maneuver to the respective ramp Ai, Bi in the building regions G3, G4. Accordingly, a prohibition with regard to a particular direction of travel of the vehicle 3 has no great benefit. If necessary, the maximum speed vMax may be defined in the building function rules R3, R4. Depending on the freight F, a door opening prohibition VT may also be expedient in the building regions G3, G4 if access to the respective freight F is to be restricted.

In the loading region G5, in loading function rules R5, it may be the case that a decoupling prohibition VA and/or a door opening prohibition VT but no reverse travel prohibition VR and also no unloading prohibition VF are provided, so as to allow the maneuvering and unloading of, for example, bulk material 33. It is also possible for the maximum speed vMax to be defined for the loading region G5 in the loading function rules R5.

In the first placement region G6, which serves for the set-down or pick-up of a trailer 3b, there may be an unloading prohibition VF and/or a door opening prohibition VT in the assigned first placement function rules R6, but a (manual or automated) decoupling prohibition VA and a reverse travel prohibition VR are withdrawn in order to allow maneuvering and coupling or decoupling. It is also possible for the maximum speed vMax to be defined for the first placement region G6 in the first placement function rules R6.

By contrast, in the second placement region G7, which serves for the set-down or pick-up of a container 30 to or from a swap body 31, it is possible, in the correspondingly assigned second placement function rules R7, for a lowering of the chassis of the vehicle 3, for example by activation of an active ride-height control system 21 (ECAS), and reverse travel to be allowed in order to allow the unloading or pick-up of the container 30 onto or from the swap body 31. A decoupling prohibition VA and a door opening prohibition VT may however be provided. It is also possible for the maximum speed vMax to be defined for the second placement region G7 in the second placement function rules R7.

In the silo region G8, it is furthermore possible, in silo function rules R8, for a (manual or automated) decoupling prohibition VA and/or an unloading prohibition VF and/or a door opening prohibition VT to be provided, whereas the reverse travel prohibition VR is withdrawn in order to allow maneuvering to the silo 35.

For the waiting region G9, it is possible, depending on the layout of the depot 1, for the unloading prohibition VF and/or the door opening prohibition VT and/or the decoupling prohibition VA to be provided in the waiting function rules R9.

For the entrance region G1 and the exit region G10, entrance function rules R1 and exit function rules R10 may be respectively defined, which are similar to the traveling lane function rules R2. Furthermore, for the entrance region G1 and the exit region G10, a handover function UF may be provided which indicates that control is at least partially relinquished upon entry into the depot 1, for the purposes of implementing the function rules Ri, and that full control is handed back to the driver or the autonomous vehicle 3 upon departure from the depot 1.

Further function rules Ri may be correspondingly defined for further function regions Gi. Furthermore, the hitherto mentioned function rules Ri for the respective function region Gi are merely exemplary and not exhaustive.

In order to implement the function rules Ri in the individual function regions Gi and accordingly be able to coordinate the vehicle 3 in the depot 1, the function control device 5 is designed to activate the brake system 20 and/or a drive system 22 and/or a steering system 24. In this way, driving dynamics of the vehicle 3 demanded in automated or manual fashion can be influenced in any desired manner by actuation or release of the respective actuators (brake, drive, steering). Here, the function control device 5 may be integrated into one of the vehicle systems 40; 20, 22, 24 or else may have a signal-transmitting connection to the respective vehicle system 40; 20, 22, 24, for example via a data bus 13, for example CAN data bus. Via this, it is for example possible for the reverse travel prohibition VR or the turning prohibition VW to be implemented or withdrawn by virtue of a corresponding automated or manual intervention into the steering and/or the drive being prevented or allowed respectively. At the same time, through corresponding activation of the drive system 22 and/or of the brake system 20, adherence to the maximum speed vMax can be ensured.

Furthermore, the function control device 5 may activate a door system 28, in order to lock or unlock the door(s) 3c of the vehicle 3 (tractor vehicle 3a and/or trailer 3b), a coupling system 29, in order to fix the trailer 3b to the tractor vehicle 3a (in manual or automated fashion), and an unloading system 26, in order to tip a loading surface 3d of the trailer 3b and/or of the tractor vehicle 3a, in order to implement or withdraw the respective prohibition VT, VA, VF. An activation of an active ride-height control system 21 (ECAS) is also possible in order to be able to raise and lower the vehicle body.

Furthermore, the function control device 5 has a signal-transmitting connection to the position acquisition system 25. In this way, the present position P of the vehicle 3 in the depot 1 can be ascertained in absolute coordinates KA or in relative coordinates KR. It is additionally also possible for data which allow position acquisition by odometry O to be transmitted, for example via the data bus 13, to the function control device 5. From the respectively ascertained position P, it is possible, by way of the previously received travel profile FP, to ascertain the function region Gi in which the vehicle 3 is presently situated. From the travel profile FP, the function rule Ri presently applicable for the vehicle 3 can then be read in automatically from the respective assignment. Here, the function rules Ri are stored on the function control device 5, for example in a library, such that it suffices for a designation of the respective function rule Ri to be communicated to the vehicle 3 or the function control device 5 by way of the travel profile FP. For this purpose, the library on the function control device 5 must be synchronized in any desired manner with the library of the depot 1 in advance.

Furthermore, in a manner dependent on the travel profile FP or the function regions Gi included therein, and in a manner coordinated with the present position P of the vehicle 3, a path plan may be created, for example in the form of a trajectory T. This indicates how the vehicle 3 should move most sensibly across the respective function regions Gi to the destination region Z and possibly also within the respective function region Gi, taking into consideration the respectively applicable function rules Ri. On the basis of this path plan, it is for example possible for automated activation of the brake system 20 and/or of the drive system 22 and/or of the steering system 24 to be performed in order to guide the vehicle 3 in (partially) automated fashion through the various function regions Gi to the destination region Z. Additionally, the function control device 5 may in this case make use of information from the surroundings acquisition system 27, to which the function control device 5 has a signal-transmitting connection.

By contrast to the prior art, this trajectory T is in this case not specified by the central module 11 but created by the function control device 5 itself, taking into consideration the function rules Ri in a manner dependent on the situation, such that the vehicle 3 itself can freely make a decision regarding the course of travel. There is therefore specifically no provision for rigidly following a trajectory T that has been fixedly specified by an external source. Rather, the vehicle 3 can itself also deviate from, or correspondingly adapt, the created trajectory T in a manner dependent on the situation and taking into consideration the function rules Ri.

In the case of manual control of the vehicle 3, it is also possible for the path plan or the trajectory T that runs via the respective function regions Gi to the destination region Z to be displayed to the driver. If the driver follows this trajectory T, then they will for example automatically adhere to the turning prohibition VW or the reverse travel prohibition in the traveling lane region G2, because the path plan is performed on the basis of these specifications. If the driver does not follow the trajectory T, then automatic activation of the respective vehicle system 40; 20, 22, 24 is performed by the function control device 5 if the travel profile FP or the function rules Ri are no longer adhered to as a result. In this case, an automated activation of the respective vehicle system 40 is performed such that both the position-related function rules Ri are adhered to and a departure from the defined function regions Gi is prevented, for example by braking of the vehicle 3. If the vehicle 3 furthermore reaches too high a speed, or if the maximum speed vMax is overshot, then the vehicle 3 is automatically braked by the function control device 5.

Additionally, an emergency function N may be provided for the manual or (partially) automated operation of the vehicle 3 in the depot 1. Said emergency function intervenes if the vehicle 3 is situated in the respective function region Gi at a position P from which the vehicle 3 cannot free itself, by activation of the brake system 20 and/or of the drive system 22 and/or of the steering system 24, without deviating from the travel profile FP or the respectively applicable function rule Ri. In this case, by corresponding clearing, the function rules Ri or any prohibitions can be withdrawn. This may be the case in particular in the event of an emergency in the depot 1. In such cases, the activation of the vehicle 3 may also be performed remotely by a remote operator 60.

Figure 3:
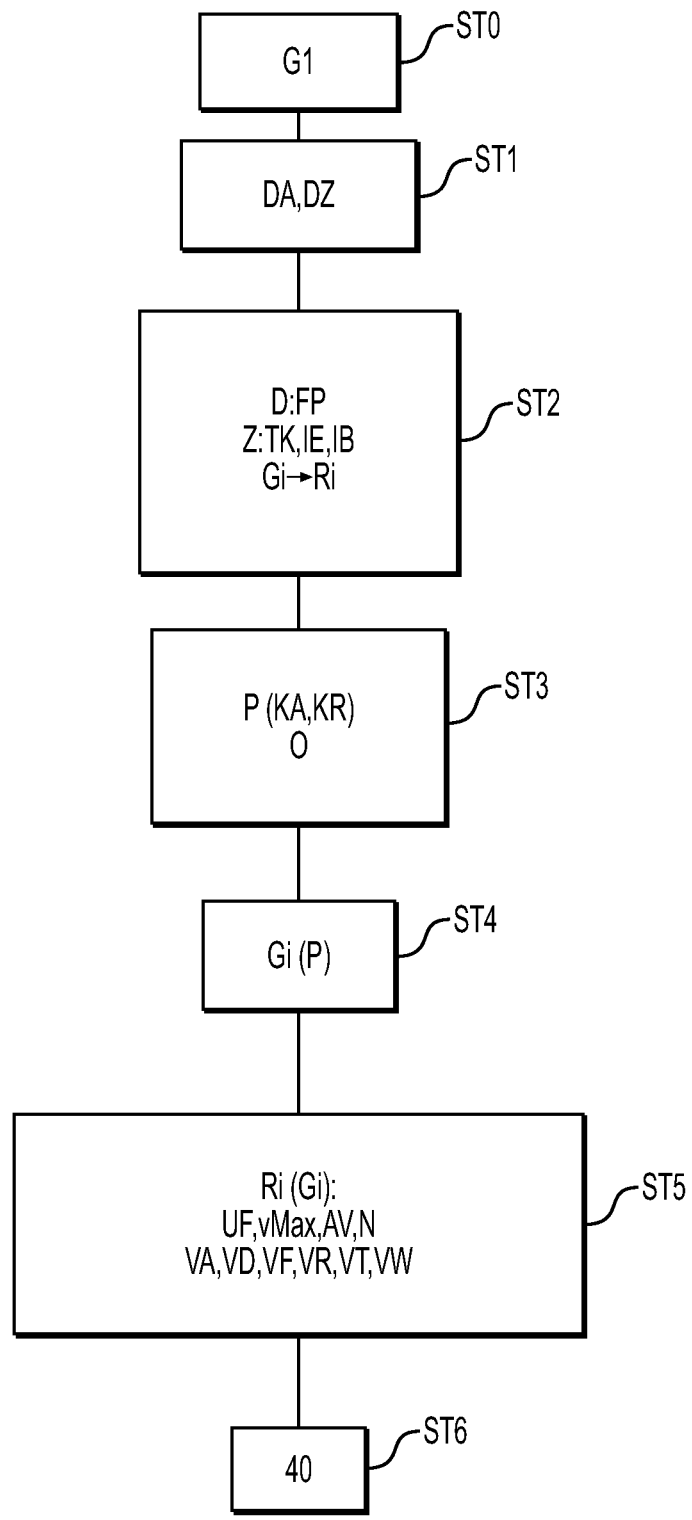
FIG. 3 shows a flow diagram of the method according to the invention.

As per FIG. 3, the method according to the invention may be carried out for example as follows:

Upon arrival at the depot 1 or after travel into the entrance region G1 (step ST0), the access is checked on the basis of the access data DZ and/or the authentication data DA in a first step ST1. If access to the depot 1 and to the local network 10 has been granted, then in a second step ST2, the travel profile FP provided for the vehicle 3, with the function regions Gi and the function rules Ri assigned thereto, is transmitted to the vehicle 3 via the then established data connection 9, wherein the travel profile FP simultaneously also includes the assigned destination region Z. Subsequently, the vehicle 3 can move from the entrance region G1 onto the premises 1a of the depot 1, wherein the conditions for this may be correspondingly defined in the entrance function rules R1 assigned to the entrance region G1.

In a third step ST3, the ascertainment of the position P of the vehicle 3 is then performed continuously by means of the position acquisition system 25 in the vehicle 3. In a fourth step ST4, the function region Gi assigned to the ascertained position P is determined from the travel profile FP. In a fifth step ST5, the function rule Ri assigned to the determined function region Gi is read in from the travel profile FP. In a sixth step ST6, in a manner dependent on the read-in function rule Ri, the respective vehicle system 40; 20, 21, 22, 24, 26, 28, 30 in the vehicle 3 is activated such that the function rule Ri in the present function region Gi is implemented.

Here, the steps ST3 to ST6 are performed continuously whilst the position P of the vehicle 3 changes in the direction of the destination region Z as a result of manual or automated activation of the brake system 20 and/or of the drive system 22 and/or of the steering system 24. The movement of the vehicle 3 in the depot 1 may in this case be performed on the basis of a path plan or a trajectory T which is determined from the travel profile FP and which leads from the entrance region G1 through the respective function regions Gi into the destination region Z and subsequently into the exit region G10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS (PART OF THE DESCRIPTION)

1 Depot
1a Premises of the depot 1
2A, 2B Building
3 Vehicle
3a Tractor vehicle
3b Trailer
3c Doors of the vehicle 3
3d Loading area
4 Entrance
5 Function control device
5a Mobile function control device
7 Access network
9 Data connection
10 Local network
10a WLAN network
11 Central module
12 Transmitting and receiving region
13 Data bus
20 Brake system
21 Ride-height control system
22 Drive system
24 Steering system
25 Position acquisition system
26 Unloading system
27 Surroundings acquisition system
28 Door system
29 Coupling system
30 Container
31 Swap body
33 Bulk material
35 Silo
40 Vehicle system
50 Other vehicle
60 Remote operator
Ai, Bi Ramp at the buildings 2A, 2B
AV Priority instruction
D Data
DA Authentication data
DZ Access data
F Freight
FMS Fleet management system FP Travel profile
FR Direction of travel of the vehicle 3
Gi Regions
G1 Entrance region
G2 Traveling lane region
G3 First building region
G4 Second building region
G5 Loading region
G6 First placement region
G7 Second placement region
G8 Silo region
G9 Waiting region
G10 Exit region
KA Absolute coordinates
KR Relative coordinates
N Emergency function
Odometry
P Position
Ri Function rules
R1 Entrance function rule
R2 Traveling lane function rule
R3 First building function rule
R4 Second building function rule
R5 Loading function rule
R6 First placement function rule
R7 Second placement function rule
R8 Silo function rule
R9 Waiting function rule
R10 Exit function rule
RV Forward direction of travel
T Trajectory
TK Participant identifier
TS Telematics system
UF Handover function
VA Decoupling prohibition
VD Travel prohibition
VF Unloading prohibition
VR Reverse travel prohibition
VT Door opening prohibition
VW Turning prohibition
vMax Maximum speed
Z Destination region
ST1, ST2, ST3, ST4, ST5, ST6 Steps of the method

What is claimed is:

1. A method for coordinating a vehicle in a depot, the depot having been mapped in advance and divided into multiple function regions, the vehicle configured to drive autonomously in the depot through at least some of the function regions into a defined destination region, the method comprising:
receiving in the vehicle a travel profile, the travel profile comprising at least one function rule, each function rule of the at least one function rule being assigned to a function region in the depot and defining how the vehicle is activated and/or may not be activated in the depot in the respectively assigned function region, wherein each function region has an area, and wherein a total area of all the function regions corresponds to an area of the mapped depot;
while the vehicle autonomously drives through at least some of the function regions into the destination region, the vehicle is configured to autonomously:
continuously ascertain a position of the vehicle in the depot;
ascertain, from the received travel profile, the function region assigned to the presently ascertained position of the vehicle;
read in, from the received travel profile, the function rule assigned to the ascertained function region; and
activate the vehicle in a manner dependent on the read-in function rule such that the function rule in the function region presently being traveled through is implemented.

2. The method of claim 1, wherein the travel profile is assigned to the vehicle and the travel profile is provided via a local network of the depot.

3. The method of claim 2, wherein the vehicle connects to the local network by access data and/or authentication data in order to obtain access to the local network and to premises of the depot in order to travel through the function regions.

4. The method of claim 2, wherein the local network comprises a WLAN network.

5. The method of claim 1, wherein the vehicle is driven in the depot from an entrance region to a destination region assigned to the vehicle, the function regions being traveled through on a path from the entrance region to the destination region.

6. The method of claim 5, wherein the destination region is defined in a manner dependent on freight which has been loaded or which is to be loaded and/or in a manner dependent on a participant identifier assigned to the vehicle.

7. The method of claim 1, wherein the function rules of the individual function regions are defined in the travel profile such that the vehicle is driven and/or may be driven in the depot only through those function regions that are required to reach the destination region and/or that are allowed for reaching the destination region.

8. The method of claim 1, wherein the read-in function rule for the respective function region is implemented by at least one vehicle system of the vehicle being activated and/or an activation of at least one vehicle system being restricted and/or prevented.

9. The method of claim 8, wherein the vehicle system comprises a brake system and/or a drive system and/or a steering system of the vehicle, the activation of which is allowable or restrictable or preventable in order to implement the function rule in the respective function region.

10. The method of claim 8, wherein the vehicle system comprises a ride-height control system and/or an unloading system and/or a door system and/or a coupling system, the activation of which is allowable or restrictable or preventable in order to implement the function rule in the respective function region.

11. The method of claim 1, wherein the function rule in the respective function region has at least one prohibition selected from a group, comprising:
a decoupling prohibition, an unloading prohibition, a reverse travel prohibition, and a door opening prohibition.

12. The method of claim 1, wherein the function rule in the respective function region has a priority instruction defining which vehicles in the respective function region must yield to other vehicles in the respective function region.

13. The method of claim 1, wherein the multiple function regions in the depot are regions selected from a group, comprising:
an entrance region, a traveling lane region, at least one building region with in each case one building and with ramps, a second building region with a building and with ramps, a loading region, a first placement region for the set-down of a trailer, a second placement region for the set-down of a container on a swap body, a silo region, a waiting region, an exit region.

14. The method of claim 1, wherein continuous ascertainment of the position of the vehicle is performed by ascertainment of absolute coordinates and/or relative coordinates of the vehicle in the depot by a position acquisition system and/or by odometry, the individual function regions also being defined by absolute coordinates and/or relative coordinates.

15. The method of claim 1, wherein the vehicle is driven in the depot through the at least some function regions based on a trajectory, the trajectory being planned in a manner dependent on the read-in function rules and/or the transmitted travel profile.

16. The method of claim 1, wherein an emergency function is provided, the vehicle being driven in the respective function region independently of the specified function rules and/or the transmitted travel profile upon activation of the emergency function.

17. The method of claim 16, wherein the emergency function is activated if the vehicle is situated in the respective function region at a position at which the vehicle is no longer capable of implementing the respectively assigned function rule.

18. A function control device for carrying out the method of claim 1, the function control device being configured to:
receive the travel profile, the travel profile comprising at least one function rule, each function rule being assigned to the function region in the depot and the function rule being capable of defining how the vehicle may be activated and/or not activated in the depot in the respectively assigned function region;
continuously ascertain the position of the vehicle in the depot;
ascertain, from the received travel profile, the function region assigned to the presently ascertained position of the vehicle;
read in, from the received travel profile, the function rule assigned to the ascertained function region; and
activate the vehicle in a manner dependent on the read-in function rule such that the function rule in the function region presently being traveled through is implementable.

19. The vehicle, comprising:
the function control device of claim 18.

* * * * *